United States Patent [19]

Stummer et al.

[11] Patent Number: 5,543,105
[45] Date of Patent: Aug. 6, 1996

[54] PRESSURE DIECASTING OR INJECTION MOLDING MACHINE

[75] Inventors: Friedrich Stummer, Fellbach; Rolf Frey, Winterbach, both of Germany

[73] Assignee: Maschinenfabrik Mueller-Weingarten AG, Weingarten, Germany

[21] Appl. No.: 315,346

[22] Filed: Sep. 30, 1994

[30] Foreign Application Priority Data

Oct. 16, 1993 [DE] Germany .................... 43 35 365.7

[51] Int. Cl.⁶ .................... B29C 45/76; B29C 45/02
[52] U.S. Cl. .................... 264/407; 264/408; 264/409; 264/40.4; 264/101; 264/328.4; 264/328.15; 425/145; 425/174
[58] Field of Search .................... 264/40.2, 40.3, 264/40.4, 40.1, 101, 102, 328.1, 328.2, 328.4, 328.15; 425/137, 145, 147, 169, 173, 174; 164/4.1, 457, 61, 65, 133, 136, 151.2, 151.3, 155.2

[56] References Cited

U.S. PATENT DOCUMENTS

| | | | |
|---|---|---|---|
| 4,850,420 | 7/1989 | Koya | 164/155.2 |
| 4,986,338 | 1/1991 | Yamauchi et al. | 164/457 |
| 5,103,893 | 4/1992 | Naganuma et al. | 164/151.3 |
| 5,361,826 | 11/1994 | Yamauchi et al. | 164/457 |
| 5,363,899 | 11/1994 | Takagi et al. | 164/457 |
| 5,375,646 | 12/1994 | Stummer et al. | 164/155.2 |

FOREIGN PATENT DOCUMENTS

| | | |
|---|---|---|
| 0005239 | 11/1979 | European Pat. Off. . |
| 0560589 | 9/1993 | European Pat. Off. . |
| 3636936A1 | 5/1988 | Germany . |
| 4112753 | 10/1992 | Germany . |
| 2-192868 | 7/1990 | Japan .................... 164/155.2 |
| 93/01909 | 2/1993 | WIPO . |

*Primary Examiner*—Jill L. Heitbrink
*Attorney, Agent, or Firm*—Spencer & Frank

[57] ABSTRACT

A method and apparatus for injection molding. The injection molding machine includes a mold formed by a fixed mold half and a movable mold half cooperating with the fixed mold half for defining a mold cavity of the mold and a gate channel leading to the mold cavity. An injection piston is operatively associated with the mold cavity for pressing a melt via the gate channel into the mold cavity. A sensor device detects a melt front of the melt rising upstream of the mold cavity in a conveying direction of the melt at a predetermined detection height. The sensor device includes walls defining a measurement gap disposed at the detection height and extending transversely to the conveying direction of the melt. The measurement gap is at least partially penetrated by a fraction of the melt from the melt front when the melt front rises toward the mold cavity. A measuring device operatively associated with the measurement gap is responsive to a presence of the fraction of the melt in the measurement gap without directly contacting the melt and generates a measurement signal for controlling predetermined parameters of the machine.

18 Claims, 4 Drawing Sheets

Section II-II

Section I-I

Section II-II

PRESSURE DIECASTING OR INJECTION MOLDING MACHINE

FIELD OF THE INVENTION

The invention relates to a pressure diecasting or injection molding machine which includes a mold formed by a fixed mold half and a movable mold half cooperating with the fixed mold half for defining a mold cavity of the mold and a gate channel leading to the mold cavity. An injection piston is operatively associated with the mold cavity for pressing a melt via the gate channel into the mold cavity. A sensor device detects a melt front of the melt upstream of the mold cavity in a conveying direction of the melt at a predetermined detection location. The invention further relates to a method for detecting the melt front in a machine of this type.

BACKGROUND OF THE INVENTION

From DE 36 36 936 A1 a pressure diecasting or injection molding machine has become known, in which a plurality of sensor-controlled evaluation circuits are provided which serve to control or regulate the individual parameters of the pressure diecasting or injection molding machine. For this purpose this machine has a multiplicity of sensors, which are situated in the drive unit for the casting or molding cylinder, in the casting or molding cylinder itself, in the gate part and in the cavity of the die or mold. The measurement signals of these sensors serve to control or regulate, for example, the prefilling phase, the die filling phase and the dwell phase of a metalworking pressure diecasting machine.

In the processing of metal or plastic melts in dies or molds it consequently becomes frequently necessary to detect the position of the front of the molten material in the injection mold or die at a particular moment in the course of the casting process. If the exact position of the melt front is known, various parameters of the casting process can be controlled or regulated in dependence on this position, for example with the aid of a computer system, and this leads, for example through uniformity of metering accuracy, to a higher quality of the parts to be produced and thus to improved economy of the casting or molding process. In addition, the position of the melt front, in conjunction with the position of the casting or injection piston, can give information for metering control.

Particularly for the detection of the melt front within the gate channel or the die or mold cavity, sensors have become known from the previously mentioned publication, which act as a contact bridge in conjunction with the electrically conductive metallic casting material. Such contact pins have the disadvantage that only reliably electrically conductive materials are recognized, while in addition drops running ahead or bridging films lead to faulty measurements.

Experiments with thermocouples instead of contact pins have shown that this arrangement does not satisfy the requirements imposed either in respect of senor life or in respect of accuracy of measurement.

The object on which the invention is based is that of avoiding the disadvantages of the prior art and in particular proposing an apparatus for detecting the melt front in pressure diecasting or injection molding machines which is simple and inexpensive in construction and which supplies reliable measurement results.

SUMMARY OF THE INVENTION

This object is achieved by the an injection molding machine which comprises a mold including a fixed mold half and a movable mold half cooperating with the fixed mold half for defining a mold cavity of the mold and a gate channel leading to the mold cavity. An injection piston is operatively associated with the mold cavity for pressing a melt via the gate channel into the mold cavity. A sensor device detects a melt front of the melt upstream of the mold cavity in a conveying direction of the melt at a predetermined detection location. The sensor device includes walls defining a measurement gap disposed at the detection location and extending transversely to the conveying direction of the melt. The measurement gap is at least partially penetrated by a fraction of the melt from the melt front when the melt front rises toward the mold cavity. A measuring device operatively associated with the measurement gap is responsive to a presence of the fraction of the melt in the measurement gap without directly contacting the melt and generates a measurement signal for controlling predetermined parameters of the machine.

It is to be understood that "injection molding" in the context of this invention pertains to the molding of both metals and plastics. Advantageous and expedient improvements of the subject of the invention are described further below.

The pressure diecasting or injection molding machine according to the invention has the advantage over known apparatus that a wear-free measurement device is provided, which in particular is suitable for harsh operating conditions and which works very reliably. At the same time, the measurement device can be attached without problems to any dies or molds in a pressure die-casting or injection molding machine, while addition to existing dies or molds is also immediately possible. The measurement device for detecting the melt front can be so designed that irregularities in the movement pattern of the melt front, for example a jet of molten material running ahead, can be eliminated and thus have no effect on a necessary switching signal.

The starting point of the invention is the basic realization that the forwardly moving melt front in a thin channel or gap similar to a capillary leads to an influence on the medium in the gap. For example, such a transverse channel arranged in a suitable position can lead to a pressure fluctuation, which serves as a measured variable for the detection of the melt front. The provision of a measurement channel, for example in the movable mold or die half, serves in accordance with the invention to enable the melt front to close or penetrate a measurement channel of this kind and thereby to trigger the desired measurement signal. When the workpiece is removed from the mold or die, the measurement channel is automatically freed again. The measurement channel is consequently preferably situated in the gate region of the movable mold or die.

In an advantageous development of the invention the measurement channel can for example be provided with a vacuum device producing a negative pressure effect in the measurement channel and giving rise to a measurement signal through the closing of the measurement channel.

As an alternative, the measurement channel can be used for penetration by a sensor device, particularly an optical sensor device, the closing of such a measurement channel or measurement gap by the melt front leading once again to action on the sensor signals.

In order to achieve the quickest possible solidification of the melt front penetrating into the measurement channel, the mold or die may have an additional cooling device for the measurement channel, which device can be coupled to a temperature measurement device.

BRIEF DESCRIPTION OF THE DRAWINGS

Further details and advantages of the invention are indicated in the following description of an exemplary embodiment of the invention with the aid of the illustration in the drawings, in which.

DETAILED DESCRIPTION OF THE INVENTION

The invention is explained more fully with reference to a metalworking pressure diecasting machine as an exemplary embodiment.

Figure 1:
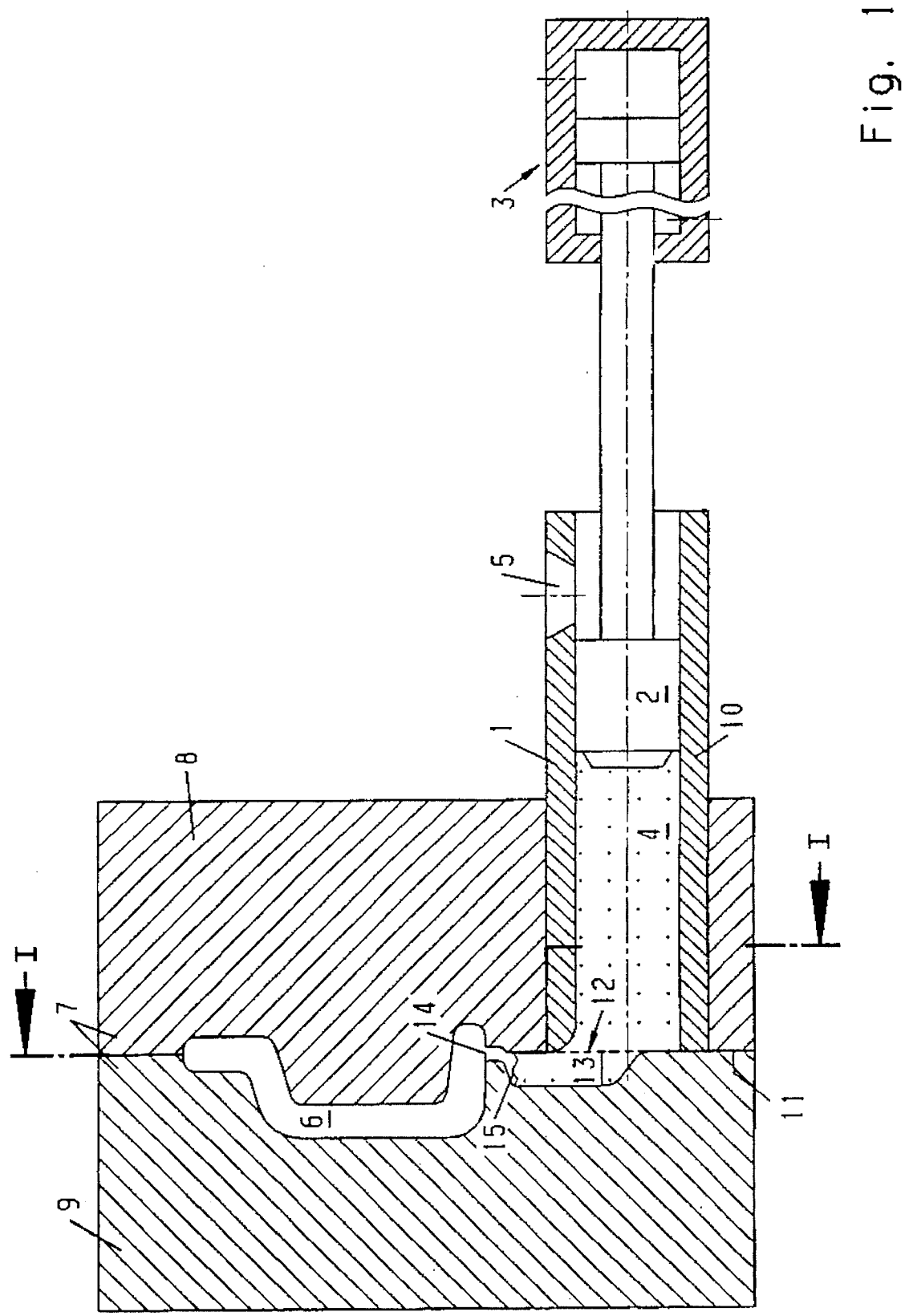
FIG. 1 is a schematic illustration of a casting equipment set in a pressure diecasting machine, together with a die.

The schematic illustration shown in FIG. 1 of the casting arrangement in a cold-chamber pressure diecasting machine has a casting chamber 1 provided with a casting piston 2, which is driven by a casting drive unit 3. The metal melt 4 is introduced via a filling opening 5 into the casting chamber 1 and by means of the casting piston 2 is pressed into the die cavity 6 of a pressure diecasting die or mold 7. The pressure diecasting die 7 consists of a fixed die half or mold half 8 and a movable die half 9. The cylindrical casing 10 of the casting chamber 1 is integrated into the fixed die half 8 and extends approximately to the interface 11 between the two die halves 8, 9 of the pressure diecasting die 7.

Between the actual die cavity 6 for forming the casting and the outlet cross section 12 of the casting chamber 1 the movable die half 9 contains an inlet channel, which is referred to as a gate part 13, for the metal melt and which must be separated as a sprue from the finished workpiece. The transition cross section between the gate part and the die cavity 6 is referred to as the ingate 14. The upward movement of the melt is indicated by arrow U.

As is also described in the publication previously mentioned, in metalworking pressure diecasting machines a distinction is made between the so-called prefilling phase, the die filling phase and the dwell phase. In order to obtain a high quality of the workpieces to be produced, the correct casting process for the control and regulation of these individual phases is of great importance. Accuracy in the metering of the metal melt inside the casting chamber 1 is possible only within certain tolerance values. The filling level in the casting chamber can therefore fluctuate. The amount of metal melt 4 inside the casting chamber 1 is thus not constant, so that on the forward movement of the casting piston the melt front can vary for each casting operation.

During the so-called prefilling phase, with the slow forward movement of the casting piston 2, the metal melt is pushed forward at low speed until the liquid level of the metal melt reaches, for example, the uppermost edge of the casting chamber. The prefilling phase may also extend to the moment when the metal melt has also filled the gate channel 13 and the foremost melt front 15 comes to lie approximately in the region of the ingate 14 between the gate channel 13 and the die cavity 6. This position is schematically indicated in FIG. 1 for the melt front 15.

From this moment onwards the prefilling phase is followed by the so-called die filling phase with a greatly increased speed of the casting piston 2 in order to fill the die cavity 6 with metal melt 4. Since the die filling phase proceeds under considerably different machine conditions, it is extremely important to obtain the correct moment of time between the prefilling phase and the die filling phase. This moment of time can easily be ascertained, with fluctuating filling levels of the casting chamber, by detecting the exact position of the melt front 15. It is therefore the object of the present invention to ascertain the exact position of the melt front 15 at a particular predetermined position in the die corresponding to a detection height of the melt, in order thereby to produce switching signals which act directly on the casting parameters. In addition, on the basis of knowledge of the exact position of the melt front, possibly in conjunction with the position of the casting piston, the control of the metered amount of metal melt can be influenced.

Figure 2:
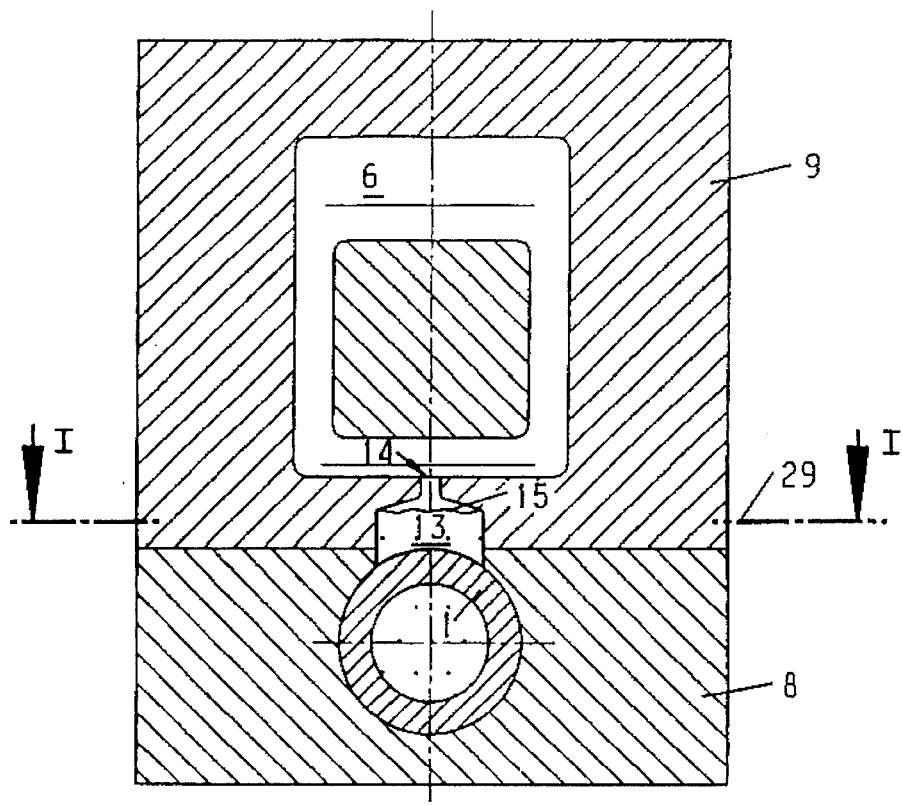
FIG. 2 shows a section on the line I—I in FIG. 1.
Figure 3:
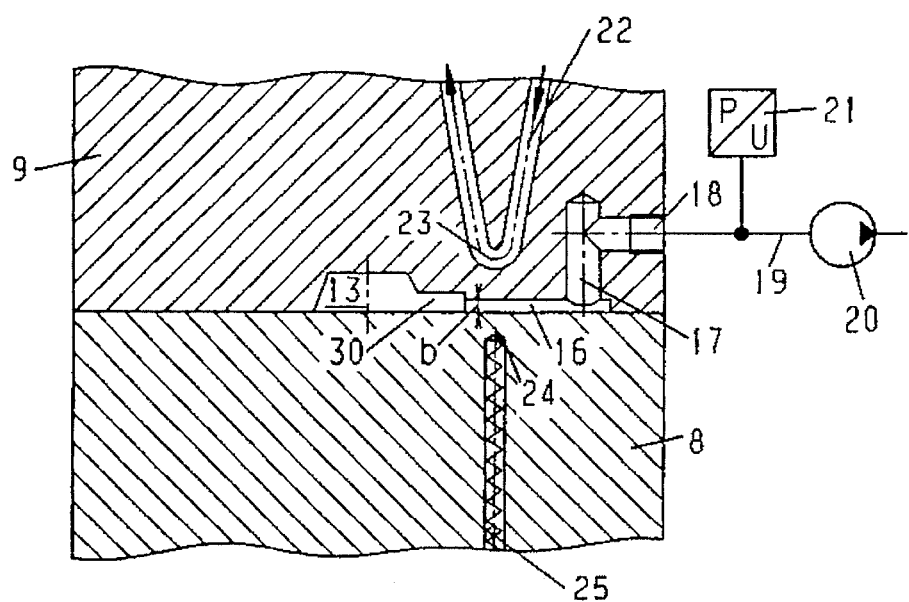
FIG. 3 shows a section on the line II—II in FIG. 2, with a measurement channel having a vacuum device.

According to the illustration of the invention in FIGS. 2 and 3, in the region of the gate channel 13 a very narrow measurement channel or measurement gap 16 is provided, which is situated under the ingate 14 in the gate channel 13 in the movable die half 9 and leads to the outside via bores 17, 18. The connection bore 18 is provided with a connection line 19 for the connection of a vacuum pump 20. The pressure in the measurement channel 16 is determined, via the bores 17, 18, in the connection line 19 with the aid of a pressure pickup 21. The thickness of the measurement channel 16 is of the order of b 0.2 mm. The melt material penetrating into this measurement channel solidifies in a very short time because of the slight thickness of this measurement channel 16. In order to achieve accelerated solidification of the melt material of the melt front which penetrates into the measurement channel 16, an additional cooling bore 22, shown in FIG. 3, is provided in the movable die half 9, the front region 23 of which bore is brought very close to the measurement channel 16 in order to cool this part of the wall. On the opposite side a measurement sensor 24, which detects the ambient temperature of the measurement channel 16, can be provided in a feed bore 25.

Figure 4:
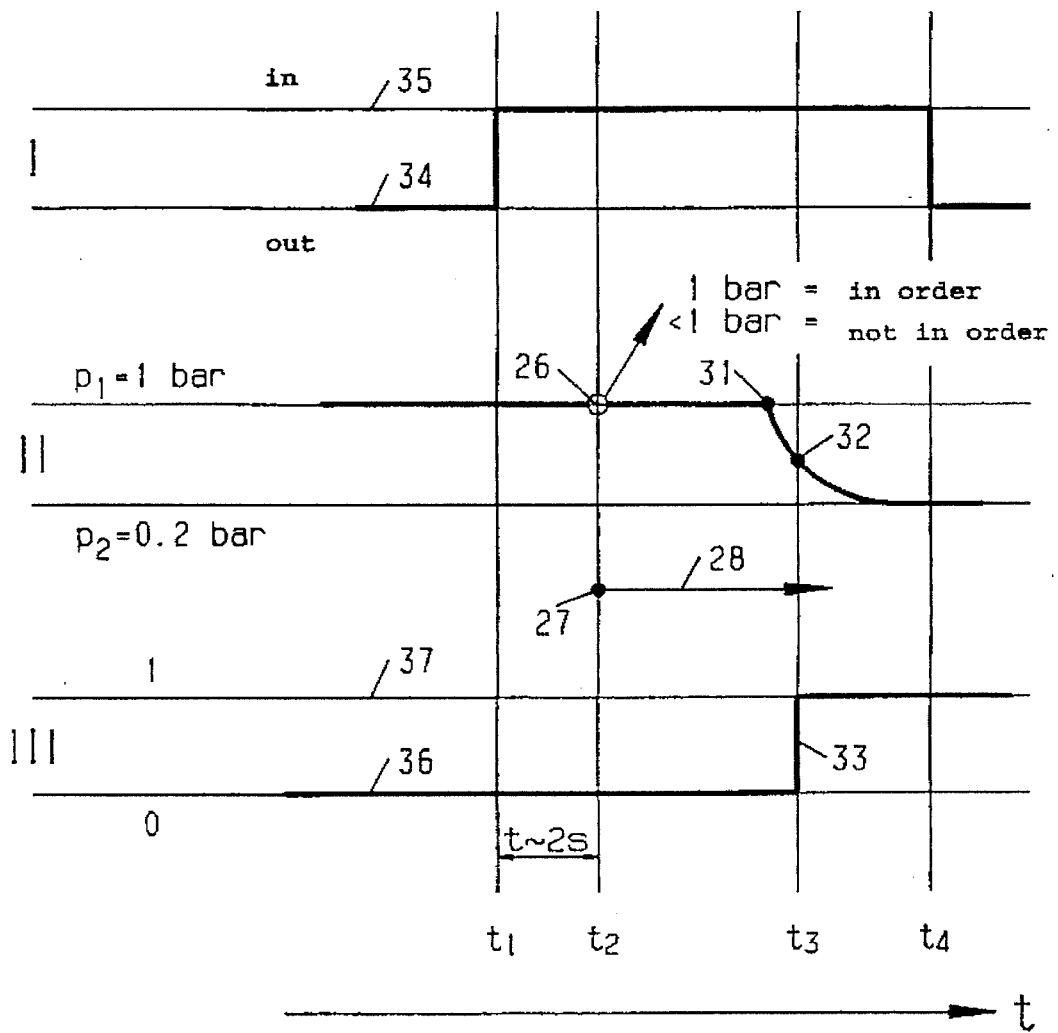
FIG. 4 shows a working diagram of the embodiment shown in FIG. 3.

The mode of operation of the measurement device for detecting the melt front is explained more fully with reference to FIGS. 3 and 4.

The diagram in FIG. 4 shows in the top part, with the designation I, the switched on and switched off states 34, 35 of the vacuum pump 20 plotted against time t, in the middle part, under the designation II, the pressure state measured in the pressure pickup 21, and, under the designation III, the switch-on time of a switching signal for the detection of the melt front.

According to the illustration in FIGS. 3 and 4, after the closing of the pressure diecasting die 7 at the point of time $t_1$, a negative pressure is applied to the measurement channel 16 by means of the vacuum pump 20. For this purpose the vacuum pump 20 works with low power. After a space of time of for example 2 seconds (point of time $t_2$) it is checked, by means of an appropriate control system, whether the entire measurement channel 16 is actually open, this being illustrated at point 26 in FIG. 4. If a pressure of $p_1$ bar exists on the pressure pickup 21 at the point of time $t_2$, the measurement channel is open and thus the system is in order. If the measurement channel 16 were closed at this point of time, because of contaminants or residues of melt which have not been removed, a negative pressure, that is to say a pressure $p_1<1$ bar, would already arise at that moment and this would lead to a faulty signal. If therefore at the point of time $t_2$ a pressure $p_1 < 1$ bar is found, the measurement system is not in order. Checking and investigation would consequently already be necessary at that point of time $t_2$.

If the checking signal is in order at the point of time $t_2$ (point 26), the forward movement of the casting piston in the prefilling phase can be started. This is indicated at the point of time $t_2$ by point 27 in FIG. 4. The arrow 28 shows the commencing prefilling phase. Because of the forward movement of the casting piston 2, the metal melt first rises in the casting chamber 1 and thereupon the gate channel 13 is filled with metal melt, the liquid metal melt 4 rising inside the gate channel 13 to the measurement height 29 shown in FIG. 2. The measurement height 29 corresponding to the detection location in the gate channel 13 can be freely selected and is situated approximately in the region of the ingate 14, that is to say shortly before the point of time at which the melt front 15 has reached the die cavity 6. The measurement channel 16 shown in FIG. 3 is situated at this measurement height 29, that is to say FIG. 3 shows a horizontal section through the two die halves 8, 9, at measurement height through the gate channel 13. When the rising melt front reaches the height of this measurement channel 16, a small measurement chamber 30 adjoining the gate channel 13 is filled with metal melt, so that the measurement channel 16 adjoining the measurement chamber 30 is closed. This closure can be brought about by partial penetration of the metal melt into the measurement channel 16. Because of the slight thickness of the measurement channel, as a vent groove, amounting for example to only b 0.2 mm, the melt solidifies extremely quickly in this measurement channel. This solidification process can be accelerated by the additional cooling by means of the cooling channel 22. From the moment of solidification onwards a negative pressure is produced in the measurement channel 16 by the vacuum pump, which continues to operate (see FIG. 4, diagram I), and is measured by means of the pressure pickup 21. This pressure drop is indicated in FIG. 4 at point 31 in diagram II. If the pressure pickup 21 signals a slight variation of the pressure $p_1$ at a value lower than 1 bar (point 32), a switching signal 33 is triggered at the point of time $t_3$ and can be used, for example, for fixing the switch-over points between the prefilling phase and the die filling phase. In FIG. 4 this switching signal is shown in diagram III by the switch state 0 = off and the switch state 1 = on, and by the reference numerals 36, 37. Through the closing of the measurement channel 16 by the melt front a pressure drop from the pressure $p_1$ 1 bar to a pressure $P_2$ 0.2 bar is accordingly brought about, and this drop can be detected by the pressure pickup 21 and leads to the switching signal 33. When this state is reached, the vacuum pump 20 can be switched off at the point of time $t_4$. This is shown at the point of time $t_4$ in diagram I in FIG. 4. The "off" state is shown by the reference numeral 34 and the "on" state of the vacuum pump 20 by the reference numeral 35.

The vacuum pump 20 is expediently arranged as close as possible to the measurement channel 16, in order to enable switching times to be minimized. The additional arrangement of the cooling channel 22 for the purpose of achieving the solidification of the melt front inside the measurement chamber 30 or the measurement channel 16 also serves to improve the operation of the measurement device and, in particular, to reduce the length of time between the arrival of the melt front in the measurement channel 16 and the triggering of the appertaining measurement signal. The additional temperature sensor 24 can also supply corresponding measurement signals for the regulation of the temperature in the measurement channel.

The proposed measurement system can of course also be used in other positions in the pressure diecasting die, the particular aim being to detect the position of the melt front inside the casting system. In addition, the measurement system can also be used in a pressure diecasting machine having a vacuum melt intake system. In this case, however, the switching thresholds of the pressure pickup must be adjusted to the negative pressure produced in the die in order to fill the latter. A pressure differential signal then serves to control other systems.

Figure 5:
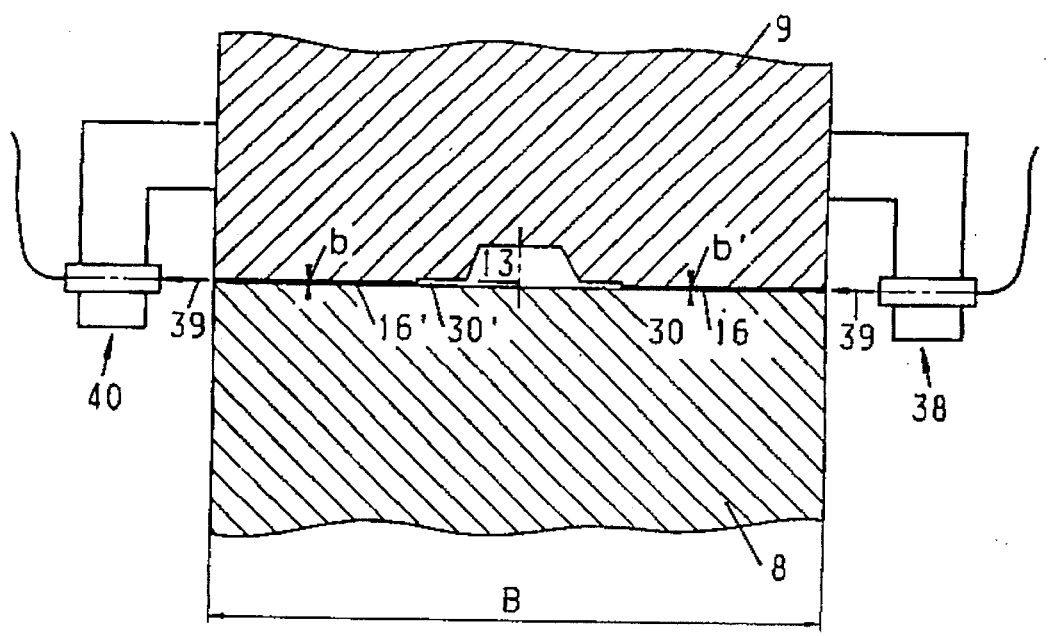
FIG. 5 shows an alternative embodiment of a measurement device in a section on the line II—II in FIG. 2.

In FIG. 5 an alternative exemplary embodiment of the invention is illustrated. In this case a measurement channel, in the form of a measurement gap 16, having a thickness b 0.2 mm extends over the entire width B of the pressure diecasting die 7. The gate channel 13 in the movable die half 9 has on both sides a measurement chamber 30, 30' leading to a measurement channel 16, 16', which has a thickness b 0.2 mm, provided on both sides. By means of a signal transmitter 38 a measurement signal or detection signal 39 can thereby be transmitted into the gap 16 from outside and on the other end of the pressure diecasting die 7 is received by a signal receiver 40. This measurement arrangement is once again situated at the measurement height 29, as described in connection with FIGS. 2 and 3. When the metal melt rises in the gate channel 13, the horizontally extending transverse grooves 16, 16' in the movable form half 9, which form the measurement gap, are once again closed by the solidifying metal, so that the measurement beam 39 is interrupted. The signal receiver 40 can then once again produce a switching signal or control signal 33 in accordance with the previously described embodiment.

The measurement devices used in the exemplary embodiment shown in FIG. 5 can be various beam transmission sensors. These may for example be ultrasonic sensors having an ultrasonic transmitter and an ultrasonic receiver. Photodiodes and light barriers can of course also be used to produce and receive a light beam, or corresponding laser transmitter and receiver devices for a laser beam may also be used. By means of this kind of sensing of the filling level of the melt front it is possible to determine the exact point of time when the measurement height is exceeded by the melt front. The signal transmitters 38 and the signal receiver 40 are in this case very accurately adjusted to the transverse grooves 16, 16' serving as measurement channels.

The metal solidified in the measurement gaps or channels 16, 16' is automatically removed, without a special ejector device, on the expulsion of the casting residue. Very simple operation of the measurement device is thereby achieved.

The invention is not restricted to the exemplary embodiment illustrated and described. On the contrary, it also includes all developments which are within the scope of those skilled in the art, within the bounds of the principle of the invention. In particular, the measurement device according to the invention can be used both for metal working pressure diecasting machines and for injection molding machines for plastic materials.

What we claim is:

1. A method of detecting a melt front of melt in an injection molding machine which includes a mold comprised of a fixed mold half and a movable mold half cooperating with the fixed mold half for defining a mold cavity of the mold and a gate channel leading to the mold cavity, the method comprising the steps of:

actuating an injection piston operatively associated with the mold cavity for pressing a melt via the gate channel upward into the mold cavity; and detecting a melt front of the melt rising upstream of the mold cavity in a conveying direction of the melt at a predetermined detection height by utilizing a sensor device which comprises walls defining a measurement gap disposed at the detection height and extending transversely to the conveying direction of the melt, the step of detecting including the steps of:

effecting at least a partial penetration of the measurement gap by a fraction of the melt from the melt front when the melt front rises toward the mold cavity; and generating a measurement signal in response to a presence of the fraction of the melt in the measurement gap without directly contacting the melt for controlling predetermined parameters of the machine.

2. The method according to claim 1, wherein the measurement gap is disposed adjacent the gate channel.

3. The method according to claim 1, wherein:

the measurement gap is a horizontal transverse groove; and the step of generating a measurement signal includes the step of producing a pressure signal in the measurement gap by creating a negative pressure in the measurement gap with a vacuum device.

4. The method according to claim 1, wherein the step of detecting further includes the step of cooling the fraction of the melt present in the measurement gap with a cooling device for accelerating a solidification of the fraction of the melt present in the measurement gap.

5. The method according to claim 4, wherein the step of detecting further includes the step of detecting a temperature of the fraction of the melt present in the measurement gap with a cooling device.

6. The method according to claim 1, wherein the measurement gap is a horizontal transverse groove extending across the mold and having a first end and a second end, and wherein the step of generating includes the steps of:

transmitting, from the first end of the measurement gap, a detection signal in a direction across the measurement gap; and receiving, at the second end of the measurement gap, and when the measurement gap is free of melt, the detection signal transmitted by the signal transmitter across the measurement gap, whereby the detection signal is interrupted by a penetration of melt into the measurement gap; and generating a control signal for controlling predetermined parameters of the machine in response to an interruption of the detection signal.

7. The method according to claim 6, wherein the steps of transmitting and receiving include the steps of utilizing one of an ultrasonic device, a laser beam device, and a light beam device having a photodiode and a light barrier.

8. An injection molding machine comprising:

a mold including:

a fixed mold half;

a movable mold half cooperating with the fixed mold half for defining a mold cavity of the mold and a gate channel leading to the mold cavity;

an injection piston operatively associated with the mold cavity for pressing a melt via the gate channel upward into the mold cavity; and a sensor device for detecting a melt front of the melt rising upstream of the mold cavity in a conveying direction of the melt at a predetermined detection height, the sensor device comprising:

walls defining a measurement gap disposed at the detection height and extending transversely to the conveying direction of the melt, the measurement gap being at least partially penetrated by a fraction of the melt from the melt front when the melt front rises toward the mold cavity; and a measuring device operatively associated with the measurement gap and responsive to a presence of the fraction of the melt in the measurement gap without directly contacting the melt for generating a measurement signal for controlling predetermined parameters of the machine.

9. The machine according to claim 8, wherein:

the measurement gap is a horizontal transverse groove;

the sensor device further includes a vacuum device operatively associated with the measurement gap for applying a negative pressure thereto; and the measuring device includes a pressure measurement device operatively associated with the measurement gap and responsive to a presence of the fraction of the melt in the measurement gap for generating a pressure signal for controlling predetermined parameters of the machine.

10. The machine according to claim 9, wherein the measurement gap is formed in one of the fixed mold half and the movable mold half.

11. The machine according to claim 8, wherein the measurement gap is formed in one of the fixed mold half and the movable mold half.

12. The machine according to claim 8, wherein the measurement gap is disposed adjacent the gate channel.

13. The machine according to claim 8, wherein the sensor device further includes a measurement chamber disposed between the gate channel and the measurement gap for collecting melt.

14. The machine according to claim 8, wherein the sensor device further includes a cooling device for cooling the fraction of the melt present in the measurement gap for accelerating a solidification of the fraction of the melt present in the measurement gap.

15. The machine according to claim 14, wherein the cooling device is a cooling channel disposed adjacent the measurement gap.

16. The machine according to claim 15, wherein the sensor device further includes a temperature measuring device for measuring a temperature of the fraction of the melt present in the measurement gap.

17. The machine according to claim 8, wherein the measurement gap is a horizontal transverse groove extending across the mold and having a first end and a second end, and wherein the measuring device further includes:

a signal detection means comprising:

a signal transmitter disposed on the first end of the measurement gap and being effective for transmitting a detection signal in a direction across the measurement gap; and a signal receiver operatively associated with the signal transmitter and disposed on the second end of the measurement gap, the signal receiver being effective for receiving the detection signal transmitted by the signal transmitter across the measurement gap when the measurement gap is free of melt, whereby the detection signal is interrupted by a penetration of melt into the measurement gap; and means responsive to an interruption of the detection signal for generating a control signal for controlling predetermined parameters of the machine.

18. The machine according to claim 17, wherein the signal detection means includes one of an ultrasonic device, a laser beam device, and a light beam device having a photodiode and a light barrier.

* * * * *